United States Patent [19]

Szulinski

[11] 4,261,952
[45] Apr. 14, 1981

[54] FUEL ROD REPROCESSING PLANT
[75] Inventor: Milton J. Szulinski, Richland, Wash.
[73] Assignee: Atlantic Richfield Company, Los Angeles, Calif.
[21] Appl. No.: 932,731
[22] Filed: Aug. 10, 1978

Related U.S. Application Data

[63] Continuation of Ser. No. 793,658, May 4, 1977, abandoned.
[51] Int. Cl.² .............................................. G21C 19/42
[52] U.S. Cl. .................................. 422/159; 250/517; 252/301.1 W
[58] Field of Search .................. 252/301.1 W; 176/37, 176/38; 250/506, 507, 517; 422/159; 214/18 N

[56] References Cited

PUBLICATIONS

Bruce, F. et al., "Operating Experience with Two Radiochemical Processing Pilot Plants", *Proc. 2nd U.N. Int'l. Conf. on Peaceful Uses Atom. Energy* (1958), vol. 17, pp. 49–72.
Stoller, S. M. et al., Eds., *Reactor Handbook vol. II: Fuel Reprocessing*, Interscience Publishers, Inc. New York, 1961, pp. 519–535.
*Proc. 3rd. Int'l. Conf. on the Peaceful Uses of Atom. Energy*, vol. 10 (1965), pp. 215–285.

*Primary Examiner*—Benjamin R. Padgett
*Assistant Examiner*—Deborah L. Kyle
*Attorney, Agent, or Firm*—John R. Ewbank

[57] ABSTRACT

A plant for the reprocessing of fuel rods for a nuclear reactor comprises a plurality of rectangular compartments desirably arranged on a rectangular grid. Signal lines, power lines, pipes, conduits for instrumentation, and other communication lines leave a compartment just below its top edges. A vehicle access zone permits overhead and/or mobile cranes to remove covers from compartments. The number of compartments is at least 25% greater than the number of compartments used in the initial design and operation of the plant. Vacant compartments are available in which replacement apparatus can be constructed. At the time of the replacement of a unit, the piping and conduits are altered to utilize the substitute equipment in the formerly vacant compartment, and it is put on stream prior to dismantling old equipment from the previous compartment. Thus the downtime for the reprocessing plant for such a changeover is less than in a traditional reprocessing plant.

1 Claim, No Drawings

FUEL ROD REPROCESSING PLANT

This application is a continuation of Ser. No. 793,658 filed May 4, 1977, now abandoned.

RELATED INVENTIONS

Reference is made to the patent applications of Milton J. Szulinski, Ser. No. 793,659, filed May 4, 1977 (Docket 05-0103A) concerned with a "Ventilating System for Reprocessing of Nuclear Fuel Rods" and Ser. No. 793,660 filed May 4, 1977 and now abandoned (Docket 05-0104A) concerned with a "Water Seal for Compartment for Reprocessing Fuel Rods" each of said applications being deemed here reiterated and incorporated herein.

FIELD OF INVENTION

This invention relates to plants for the reprocessing of depleted fuel rods employed in a nuclear reactor.

PRIOR ART

Heretofore a pamphlet published by the Energy Research and Development Administration in May 1976 entitled, "Radioactive Waste Management at Hanford" describes one type of traditional reprocessing plant which happens to be designed for recovery of neptunium as well as plutonium and uranium. The Purex Extraction portion of said Hanford Reprocessing Plant has processing equipment for sequentially dissolving depleted fuel rods, treating such solutions with extractants for the recovery of components such as plutonium and uranium and for the isolation of fission products, actinides, and other high level radioactive waste, which are further processed in buildings different from the Purex plant. The depleted fuel rods are dissolved to provide an aqueous solution which is subjected to solvent extraction to recover the plutonium, uranium, and neptunium. Each of the neptunium, uranium, and plutonium streams is purified by a series of processing steps. The fission products are separated and processed in an appropriate manner.

By reason of the varying demands relating to the ultimate disposition of the fission product and the contemplated end use of the uranium fraction and the plutonium fraction, different processing schemes for fuel rods are appropriate. It is highly desirable that the process be sufficiently flexible to permit some modification of the processing subsequent to start-up. Substantially all operations within a reprocessing plant are conducted by remote control, and accordingly are quite costly. Some of the reprocessing plants built in the last two decades have been abandoned because of the excessive cost of retrofitting to install equipment needed for modifications of the process. There has been a long standing demand for a reprocessing plant having the flexibility to permit alterations of the process without excessive downtime after start-up of the plant.

In fuel rod reprocessing plants such as the Purex facility at Hanford, it has generally been the custom to provide a canyon in which the vehicle access area was a system of overhead cranes and the various items of processing equipment were positioned linearly along the length of the canyon. Such an arrangement has numerous advantages from the standpoint of minimum cost for initial construction. However, such linear canyon has numerous disadvantages when dealing with retrofitting apparatus for modifying the process. Moreover, the reliance upon overhead cranes in the vehicle access area has disadvantages when dealing with emergencies requiring the overhead crane to shift from one spot to another along the length of the path of the crane. If there was leakage of liquid from a processing tank and/or pipe, there was the hazard of a plurality of processing vessels being contaminated because the canyon partook of the nature of a single compartment.

Certain processing units in a reprocessing plant have a lifetime significantly less than the contemplated total lifetime of the reprocessing plant. In a Hanford canyon type of structure, the plant is shut down and a processing unit is dismantled and replaced by a substitute unit in order to deal with the replacement problem. Thus the downtime for such necessary maintenance has been a significant burden in the operation of reprocessing plants. Once in operation, a reprocessing plant represents an investment of such large size that there are financial incentives for minimizing the downtime of a reprocessing plant.

SUMMARY OF THE INVENTION

In accordance with the present invention, a fuel rod reprocessing plant includes the combination of an array of a plurality of deep compartments having horizontal cross sections which are generally rectangular, such array desirably being such that many of the compartments are in a rectangular grid arrangement; a vehicle access zone which is generally above the array of deep compartments; rectangular covers for the compartments, each cover being liftable by a vehicle in the vehicle access zone; an equipment support floor in each compartment; processing equipment on support floors on each of several deep compartments, there being communication lines extending from the processing equipment to processing equipment in other compartments, a significant portion of such communication lines between compartments being near the top of said compartments and accordingly immediately beneath the vehicle access zone; a control room shielded biologically from said compartments and said vehicle access zone; monitoring and control means adapted to permit control room operation of the process equipment in said deep compartments; a sump pit beneath the support floor in each deep compartment, said sump pit being adapted to permit the monitoring and detection of any liquid spilled in such compartment; drainage systems from sump pits to annular storage tanks adapted to minimize the possibility of accumulation of large masses of plutonium containing liquid may be appropriate for some compartments; the number of compartments in said array of compartments being at least one fourth greater than the number of compartments required for normal operation, whereby processing equipment scheduled for substitution can be constructed in a vacant compartment prior to disconnection of corresponding processing equipment scheduled to be withdrawn from service, whereby operations can be resumed after making the piping connections for said processing equipment scheduled for substitution, and whereby the downtime for the reprocessing operations can be lessened when scheduling replacement of equipment.

DESCRIPTION OF DRAWINGS

As shown in the drawings:

The reprocessing plant 10 comprises a building 11 having a pair of side walls 12a and 12b, a pair of end walls 13a and 13b, and a roof 14. Beneath the roof 14 is a vehicle access zone 15. As shown in FIG. 1, a crane 16 is a vehicle which can travel in the vehicle access zone 15. The crane 16 is shiftable parallel to the end walls 13 by movement along a carriage 18 which can be moved on its supports 19 on side walls 12. An array 20 of compartments 21 having rectangular cross sections is arranged on a rectilinear grid pattern conveniently called a grid iron pattern. Each compartment has a removable rectangular cover 22. As shown in FIG. 1, crane 16 can lift a rectangular cover 22 for rectangular compartment 21. Extending upwardly from a foundation 23 are a series of vertical walls 24 serving as compartment walls. A ledge 25 at the top of each compartment wall 24 is adapted to support an edge of a cover 22. A plurality of openings 26 in a compartment wall 24 just beneath the cover supporting ledge 25 permit the installation of suitable piping, communication lines, power lines, and other communication lines 30 for the remote control operation of the various steps conducted in the compartments 21. A support floor in each compartment 21 permits the positioning of the equipment in a compartment. An emergency sump pit 28 has sensors 29 adapted to alert operating personnel immediately after leaking liquid is detected in the sump pit 28.

Figure 1:
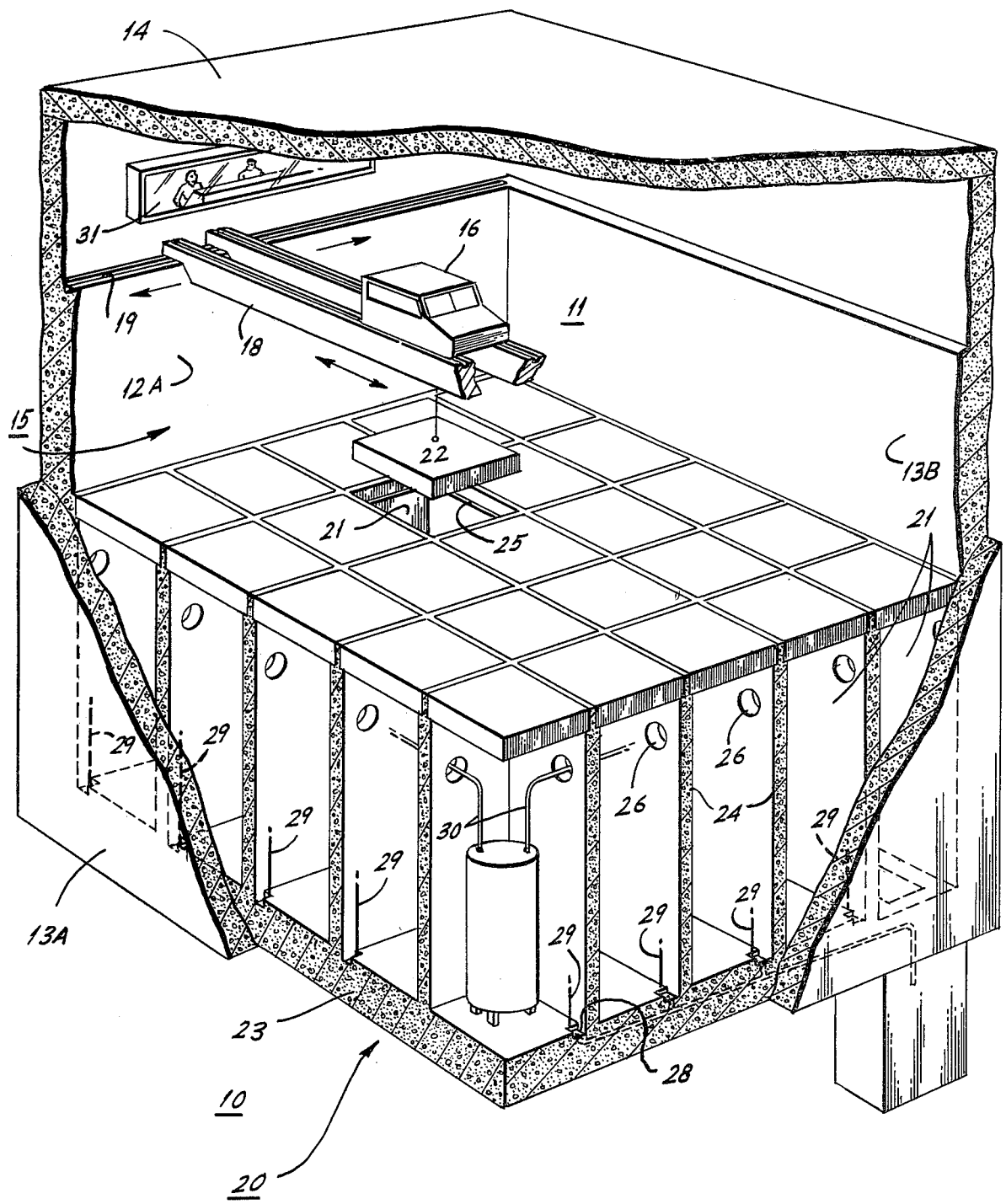
FIG. 1 is a perspective schematic representation of a portion of a reprocessing plant.

Particular attention is directed to the fact that each compartment 21 has its own sump pit 28 so that in the event of an emergency leakage of liquid, the liquid in a specific emergency sump pit is promptly detected and its location identified.

Processing equipment is constructed on the support floor of a compartment 21, and the communication lines 30 thereto are connected to the processing equipment in that compartment. The processing equipment in the various compartments are interconnected so that the reprocessing operation can be conducted by remote control. A control room 31 is biologically shielded from the radiation in the compartments 21 and even the amount of radiation in the vehicle access zone 15. The processing apparatus in each compartment 21 can be controlled and regulated by remote control from the control room 31.

Particular attention is directed to the feature whereby at least about 25% of the compartments 21 are vacant at the time when the reprocessing plan is ready for start-up. Such provision for vacant compartments necessitates longer communication lines and a larger building than would be the minimum investment for a reprocessing plant. The availability of vacant compartments scattered about the gridiron array of compartments makes it feasible to retrofit modifications of the processing scheme after the start-up of the reprocessing plant. Of particular importance is the availability of the vacant compartments during replacement of process equipment for achieving a minimized downtime in the reprocessing plant. The useful life of the total reprocessing plant can be significantly greater than the useful life of certain components. In the event of the scheduling of the replacement of a large piece of equipment occupying a significant portion of a compartment, it is feasible to construct the substitute apparatus in a vacant compartment and to have it ready for utilization as soon as the changes in the communication lines can be achieved. After the changeover and after the new equipment is being utilized, the slow process of dismantling and removal of the old apparatus from the old compartment can be conducted without any prolongation of the downtime of the reprocessing plant. The total investment in a reprocessing plant is so great that once the plant is in operation, there are many incentives for minimizing the downtime thereof.

Figure 2:
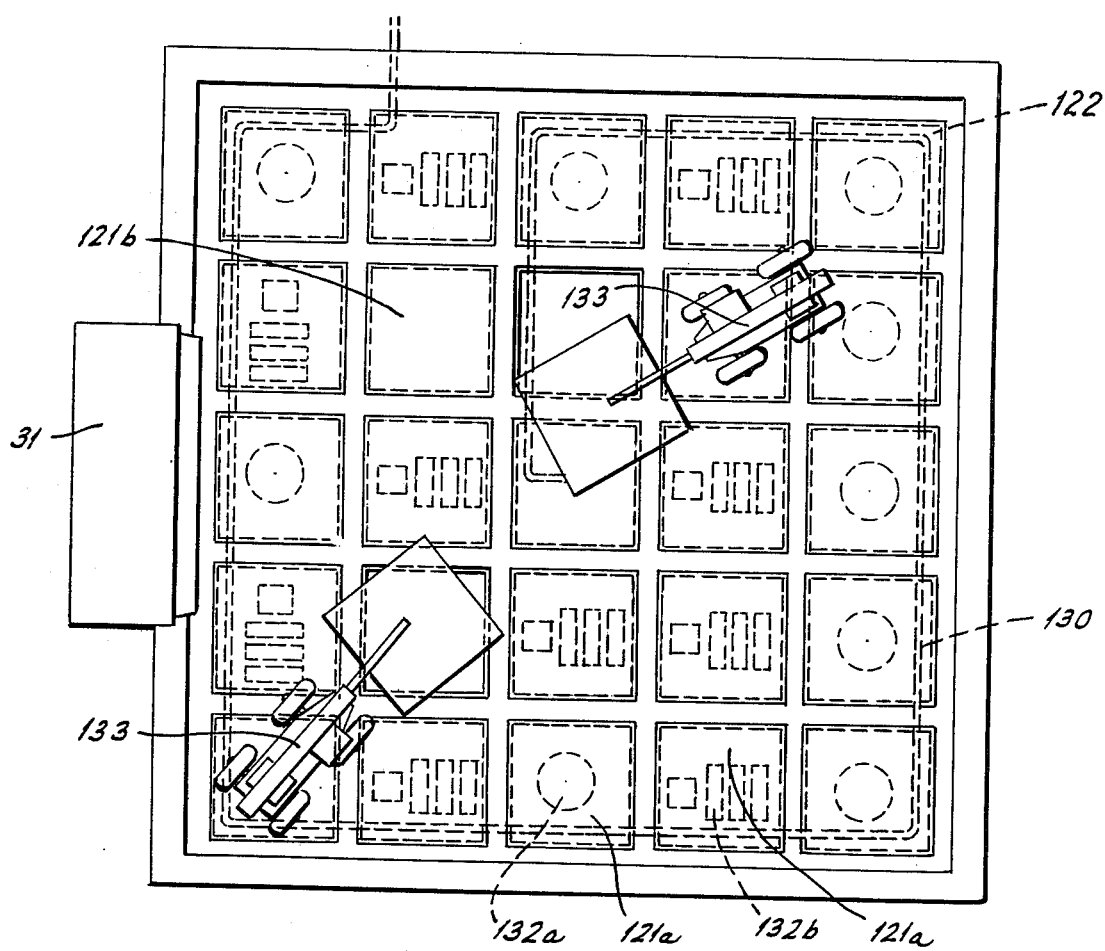
FIG. 2 is a schematic top plan view of a vehicle access zone of a reprocessing plant.

As shown in FIG. 2, suitable processing equipment 132a, 132b, etc. can be positioned in appropriate compartments 121a. Appropriate compartments 121b can be left initially vacant. Mobile cranes 133 on wheels can move about the area formed by the covers 122 over the compartments.

Figure 3:
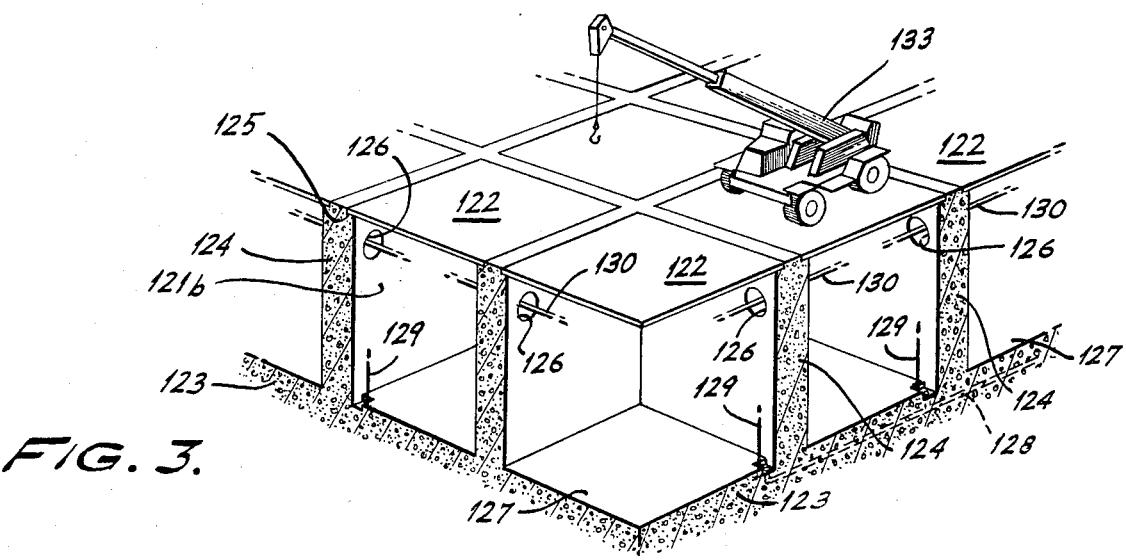
FIG. 3 is a schematic perspective view of a portion of the vehicle access zone of FIG. 2.

As shown in FIG. 3, a mobile crane 133 on wheels can shift about readily from any parking space toward the specific compartment at which a crane is needed. Heretofore in the operation of a canyon-type reprocessing plant, problems have arisen from the inherent slowness with which an overhead crane could move to an area of emergency need. Moreover, such canyon type plant has encountered problems when cranes were needed in a greater number of locations than servable by the overhead crane system. Mobile cranes contribute to speed of attention and multiple location flexibility in servicing the reprocessing plant.

In the reprocessing plant any of the many proposed schemes for treating the materials can be practiced. It is ordinarily desirable to receive the depleted fuel rods from a surge storage area, and to chop the rods into small bits giving more ready access to the pellets. Voloxidation at an elevated temperature can volatilize a significant portion portion of the volatilizeable fission products and provide a metal oxide mixture which can be cooled to a temperature at which it can be dissolved in aqueous nitric acid. The aqueous solution comprising a mixture of uranium nitrate, plutonium nitrate, and miscellaneous nitrates is subjected to the various purification steps, including extraction with tributylphosphate, for preparing separate streams of plutonium nitrate and uranium nitrate, (the two particularly valuable streams from the reprocessing plant) and for preparing streams of higher actinides, streams of fission products (further processed to remove the most troublesome components, and to make feasible the conversion of a significant portion of the fission products to a solid glass suitable for long term storage) and for preparing streams of cladding metal nitrates. The products recovered from the initial volatilization step are also subjected, insofar as feasible, to processing as aqueous solutions of nitrates. As the design for the temperature of the initial volatilization step is increased, the complexities of the purification of the overhead increase. Significant advantages accrue from maintaining a relatively large melt of uranium oxide at about 2200° C., flash volatilizing the fuel rod components by dumping them in the melt, applying the heat and oxidation at the top of the melt, and withdrawing crude molten uranium oxide at a rate corresponding to the rate at which it is added in the form of bits of depleted fuel rods. The processing of the aqueous nitrate solutions to permit preparation of adequately purified streams of uranium nitrate and plutonium nitrate (the output streams assumed to be the most valuable streams from the reprocessing plant) can be conducted in the gridiron array of compartments, while various other steps of the total reprocessing scheme, including the volatilization of the maximum amount from the bits of depleted fuel rods, can be conducted in appropriate separate facilities.

Even if the volatilization and oxidation of the bits is conducted at a temperature as low as 400° C., the purification of the uranium nitrate solution can avoid some of the steps appropriate when the bits are dissolved in aqueous nitric acid without any preliminary volatilization step. Fuel, heat, and oxygen usually are supplied to the volatilization zone to provide simultaneous volatilization and oxidation. The advantageous gridiron array of deep rectangular compartments is useful without regard to the specifics of the reprocessing scheme. Using electric heat and carbon monoxide as a sweeping gas, the volatilization could be reductive instead of oxidative.

Of particular importance, the gridiron array of deep rectangular compartments, the availability of mobile cranes, and particularly the availability of vacant compartments, makes feasible greater flexibility in retrofitting process changes after start-up and in replacing equipment than has been attainable in the canyon type of reprocessing plant.

Various modifications are possible without departing from the scope of the claims defining the invention.

I claim:

1. In a depleted fuel rod reprocessing plant, the combination of:

an array of a plurality of deep compartments having horizontal cross sections which are generally rectangular, said compartments being arranged so that a predominant portion of the horizontal cross sections are arranged in a rectangular grid having several adjacent compartments in each of the rectangular directions, some of said compartments being vacant during initial operation of said reprocessing plant, whereby said vacant compartments are available as substitute compartments during a subsequent stage of use of the reprocessing plant;

a vehicle access zone which is generally above said array of deep compartments;

rectangular covers for said deep compartments, each cover being liftable by a vehicle in the vehicle access zone to expose the open top of a deep compartment, the closed covers for said closed compartments providing an area in said vehicle access zone on which mobile cranes on wheels can move about;

mobile cranes on wheels on said area;

an equipment support floor in each compartment;

depleted nuclear fuel processing equipment on support floors of each of several deep compartments, there being communication lines extending from the processing equipment to processing equipment in other compartments, said communication line connections between compartments being predominantly near the top of said compartments;

a control room shielded biologically from said compartments and said vehicle access zone;

monitoring and control means adapted to permit control room operation of the process equipment in each of said deep compartments;

a sump pit in each deep compartment, said sump pit having sensors promptly alerting personnel about any liquids spilled in such compartment;

the number of compartments in said array of compartments being at least one fourth greater than the number of compartments required for normal operation whereby a substitute unit of processing equipment may be constructed in a vacant compartment prior to disconnection of corresponding processing equipment scheduled to be withdrawn from service, whereby operations need be interrupted only for the time necessary to make the piping connections for said substitute unit.

* * * * *